(12) United States Patent
Askeland et al.

(10) Patent No.: US 6,631,964 B2
(45) Date of Patent: Oct. 14, 2003

(54) PRINTING DATA ON A NON-INTEGER DOT GRID FOR IMPROVED SATURATION

(75) Inventors: Roanld A. Askeland, San Diego, CA (US); Ronald Burns, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/981,046

(22) Filed: Oct. 16, 2001

(65) Prior Publication Data

US 2003/0076374 A1 Apr. 24, 2003

(51) Int. Cl.$^7$ ................................................. B41J 2/205
(52) U.S. Cl. ........................... 347/15; 358/1.9; 358/1.2; 358/429
(58) Field of Search ............................. 347/15, 43, 14, 347/19; 358/1.9, 1.2, 521, 429

(56) References Cited

U.S. PATENT DOCUMENTS 6,226,420 B1 * 5/2001 Hamill ....................... 382/299

* cited by examiner

Primary Examiner—Lamson Nguyen (57) ABSTRACT

A system and method of printing allows mapping between an input print data file and an output dot grid data file, wherein the resolution of the resolution of the dot grid is not an integer multiple of the print data. A method includes forming an input print data group of pixels within the print data file and forming an output dot grid group of a different number of pixels within the dot grid data file. The pixels within the input group are associated pixels within the output group by a mapping function. By varying the number of pixels within the two groups, the printhead nozzle firing frequency and the rate of ink deposition per unit area of media may be controlled. Accordingly, print output quality may be maximized given the constraints of the hardware available.

21 Claims, 4 Drawing Sheets

PRINTING DATA ON A NON-INTEGER DOT GRID FOR IMPROVED SATURATION

TECHNICAL FIELD

This disclosure relates to a method and apparatus that in general balances the rate of ink-jet printhead nozzle firing with the density of ink deposited per unit area, and in particular resolves differences between the format of the print data and the print dot grid.

BACKGROUND

It is common for print data to have a format that differs from the print dot grid used to print that data. For example, an 8-bit, 16-bit or higher color resolution RGB (red, green, blue) color data file for display on a CRT (cathode ray tube) or similar display may be mapped to a 1- or 2-bit CMYK (cyan, magenta, yellow, black) color data file for operation of a printer. In this case, the RGB data file has much greater color resolution, but has much lower dot or pixel resolution. Halftoning algorithms attempt to avoid data loss in the translation by finding a means to associate the color depth of the RGB file with the greater resolution of the CMYK file. After halftoning, some mapping or translation of the resulting CMYK file may be necessary, depending on the printer's resolution.

Figure 1:
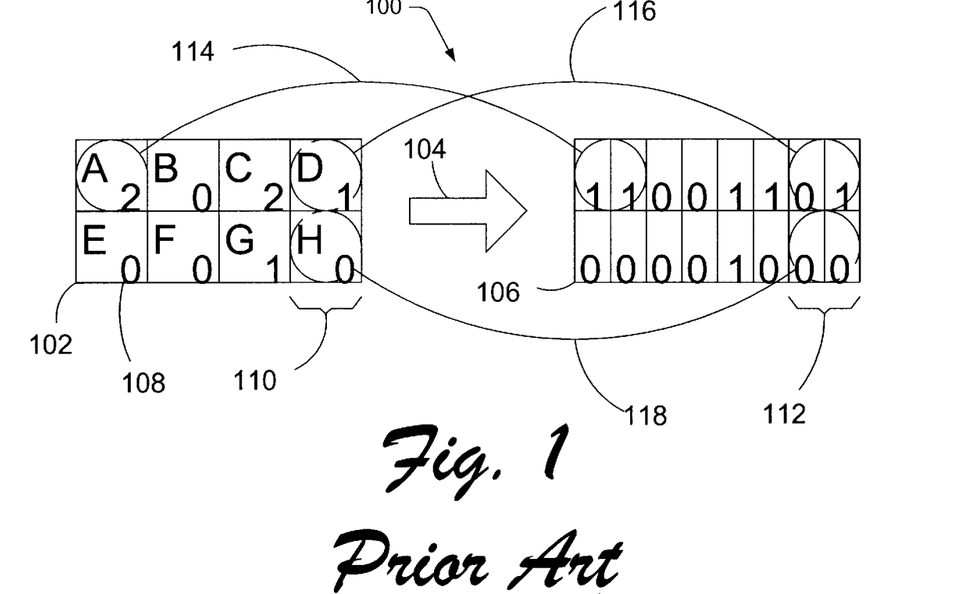
FIG. 1, Prior Art, is an illustration of a process by which each pixel within an input print data file is mapped to a whole number multiple of pixels within an output dot grid data file.

For example, FIG. 1, Prior Art, shows an exemplary post-halftoning process 100, wherein each pixel within an input print data file is mapped to a whole number of pixels within an output dot grid data file. A representation of an input print data file 102, may be the output of a halftoning process, and contains pixels having a resolution of 600 by 600 dots per inch (dpi). A mapping process 104 maps the input print data file 102 into an output dot grid data file 106 having a 1200 by 600 dpi pixel resolution.

Each pixel 110 within the input print data file may have a numeric value 108, representing the color depth. For example, the color depth may be 2-bit; that is, each pixel of color data is associated with a number from 0 to 3. In a typical prior art application, the color depth may be restricted to include only numbers from 0 to 2. Thus, during the mapping process, each pixel 110 of the print data, having a value from 0 to 2, is associated with a pair of pixels 112 within the output dot grid data file 106. The mapping may be performed by entering either zero or a one in data locations representing the pixels within the output dot grid data file. Three exemplary mappings 114, 116, 118 show how input print data 102 having a value of 2, 1 or 0, respectively, can be mapped to an output dot grid data file 106. In this manner, the prior art is able to map a print data with lower dot resolution and greater color bit depth into dot grid data with higher resolution and less bit depth.

However, as result of this mapping process, data associated with each pixel 110 in the input print data file 102 is mapped to two, three or other whole number multiple of pixels 112 in the output dot grid data file. Accordingly, the printers of the prior art tend to have resolutions such as 300 by 300 dpi, or 600 by 300 dpi, or 1200 by 600 dpi. These increasingly large steps by which resolution is increased can result in many design and output problems.

Generally, a greater number of dots per inch in the output results in a greater ink saturation, and better print output. In one example, a 600 by 600 dpi resolution dot grid may result in four 18 ng (nano gram) dots of black ink (72 ng total) within a $\frac{1}{300}$ by $\frac{1}{300}$ square inch unit area. This may be inadequate for optimal coverage. By increasing to 1200 by 600 dpi, 144 ng of ink per inch is deposited. However, using a 45 inch per second rate of printhead movement along the carriage, the 1200 by 600 dpi rate may require a pen speed (rate of printhead nozzle firings) of 54 KHz, which may be beyond the capability of the hardware. This may require slowing of the rate of printhead movement, and therefore the rate of overall printing, or other equally unattractive option.

Thus, it can be seen that in the prior art, the options available to the printer designer may include too little ink saturation, expensive hardware upgrades to support faster pen speed or slowing the overall rate of print output. Accordingly, there is a need to provide better choices for the printer design engineer.

SUMMARY

A system and method of printing allows mapping between an input print data file and an output dot grid data file, wherein the resolution of the dot grid is not an integer multiple of the print data. A method includes forming an input print data group of pixels within the print data file and forming an output dot grid group of a different number of pixels within the dot grid data file. The pixels within the input group are associated pixels within the output group by a mapping function. By varying the number of pixels within the two groups, the printhead nozzle firing frequency and the rate of ink deposition per unit area of media may be controlled. Accordingly, print output quality may be maximized given the constraints of the hardware available.

BRIEF DESCRIPTION OF THE DRAWINGS

The same numbers are used throughout the drawings to reference like features and components.

DETAILED DESCRIPTION

A system and method of printing allows mapping between an input print data file and an output dot grid data file, wherein the resolution of the dot grid is not an integer multiple of the print data. A method includes forming an input print data group of pixels within the print data file and forming an output dot grid group of a different number of pixels within the dot grid data file. The pixels within the input group are associated pixels within the output group by a mapping function. By varying the number of pixels within the two groups, the printhead nozzle firing frequency and the density of ink deposition per unit area of media may be controlled. Accordingly, print output quality may be maximized given the constraints of the hardware available.

Figure 2:
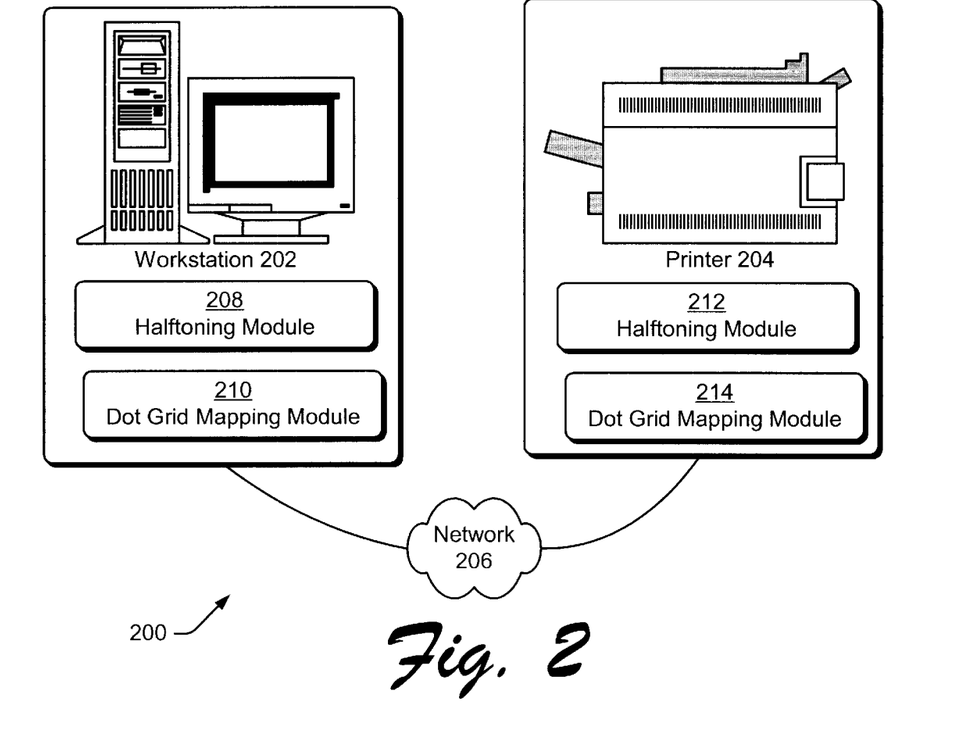
FIG. 2 is a diagram illustrating a print system which prints data on a non-integer grid for improved saturation.

FIG. 2 shows an exemplary print system 200 for printing data on a non-integer dot grid for improved saturation. The exemplary print system includes a workstation 202 or similar computing device in communication with a printer 204 through a network 206, such as a cable, a LAN or the Internet. The workstation may include a halftoning module 208 and non-integer dot grid mapping module 210. Similarly, the printer may include a halftoning module 212 and non-integer dot grid mapping module 214. The halftoning module and non-integer dot grid mapping module may be installed on the workstation, printer, a server and/or other location. As will be seen in greater detail, either halftoning module 208, 212 may be used to produce color image data files, and to limit the values associated with each pixel in such a file. The non-integer dot grid mapping module 210, 214 may be used first to allow an engineer to balance the rate of ink-jet printhead nozzle firing with the density of ink deposited per unit area, and second to resolve differences between the format of the print data and the print dot grid in the printing process. In particular, the non-integer grid mapping module allows a number or pixels in an input file to be grouped, and then mapped, to a different number of pixels in the output file, wherein the quantity of pixels in one group is not an integer multiple of the quantity of pixels in the other group.

Figure 3:
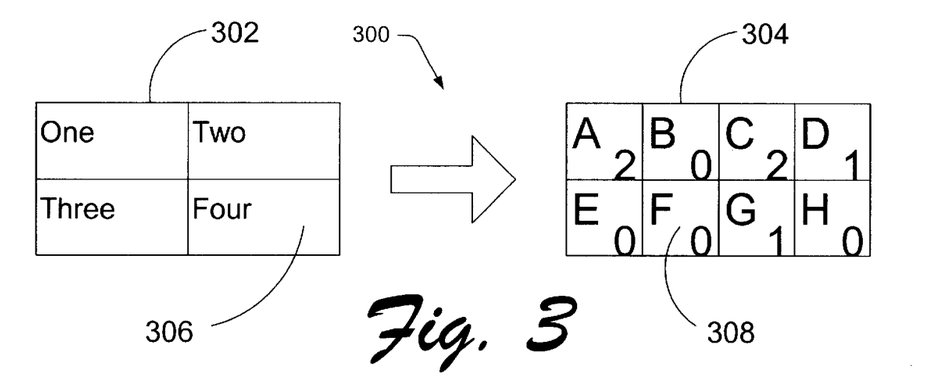
FIG. 3 is a block diagram illustrating a halftoning process by which an input print data file is created.

FIG. 3 shows a halftoning process 300, whereby a color image data file 302, in a format such as an RGB (red, green, blue) is converted into a halftoned print data file 304, in a format such as a CMYK (cyan, magenta, yellow, black). The color image data file 302 is suitable for display by hardware, such as a CRT-type (cathode ray tube) monitor, which is capable of displaying thousands of colors on any given pixel, but only a relatively limited number of pixels 306 per inch. The halftoned image data file 304 is suitable for display by hardware, such as an inkjet printer, which is capable of display of a more limited number of colors per pixel location, but which is capable of displaying a much greater number of pixels 308 per inch.

In one implementation, the resolution of the halftoned print data file 304 may be 600 dpi (dots/pixels per inch) by 600 dpi. The bit-depth of each pixel within the file may be 2-bit. Thus, data associated with each of the pixels 308 may potentially be assigned a value from zero to three. In the implementation seen, the bit-depth values are held to a maximum of 2.

Figure 4:
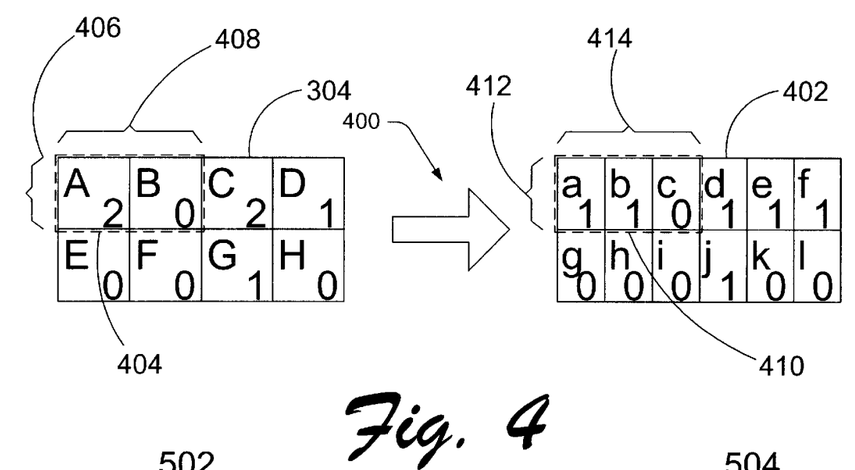
FIG. 4 is a block diagram illustrating an exemplary process by which 600 by 600 dpi 2-bit data is mapped to 900 by 600 1-bit data.

FIG. 4 shows a first implementation of a mapping process 400 by which, typically after halftoning, the input print data 304 is converted into an output dot grid data file 402. For reasons of clarity, a representation of only a small portion of the data files 304, 402 is shown. In the exemplary mapping of FIG. 4, the sum, 2, of the values associated with input pixels "A" and "B" is equal to the sum, 2, of the values associated with the output pixels "a," "b" and "c." Alternatively, a mapping process could be developed, wherein the sum of the input pixels does not equal the sum of the output pixels. This is typically the case during multi-pass printing, where the sum of the output dot grid values can exceed the sum of the input print data values.

In the implementation of FIG. 4, an input data group having two pixels is mapped to an output data group having three pixels. Unlike a mapping process form one pixel to two pixels (wherein the multiplicative factor is 2) the mapping of FIG. 4 is from two pixels to three pixels, the mapping process may be considered to be non-integer (because the multiplicative factor is 1.5).

An input data group (or print data group) 404 (in dotted outline) is defined, and typically comprises the data associated with one or more adjacent pixels. In the implementation of FIG. 4, the input data group is formed by grouping pixels in an array having height 406 and width 408, wherein the height is one pixel and the width is two pixels. In an alternative implementation, a different height and/or width could be utilized; similarly, the input data group is not required to be rectangular.

An output data group (or dot grid data group) 410 (in dotted outline) is defined, and typically comprises the data associated with a quantity of one or more adjacent pixels that is different from the quantity of pixels contained within the input data group 404. Because the resolution of the input print data 304 is generally less than the resolution of the dot grid data 402, the number of pixels contained within the output data group is generally greater than the number of pixels contained within the input data group. In the implementation of FIG. 4, the output data group is formed by grouping pixels in an array having height 412 and width 414, wherein the height is one pixel and the width is three pixels. In an alternative implementation, a different height and/or width and/or non-rectangular shape could be utilized.

Continuing to refer to FIG. 4, the input data group 404 is mapped to the output data group 410 by the process 400. The input data group includes two pixels, in this example having values two and zero. The input data group is mapped to an output data group formed by three pixels, "a," "b" and "c" having values 1, 1 and 0. Similarly, a second input data group formed by pixels "C" and "D" having values 2 and 1, respectively, are mapped to a second output data group formed by three pixels, "d," "e" and "f" each having a value of 1.

Figure 5:
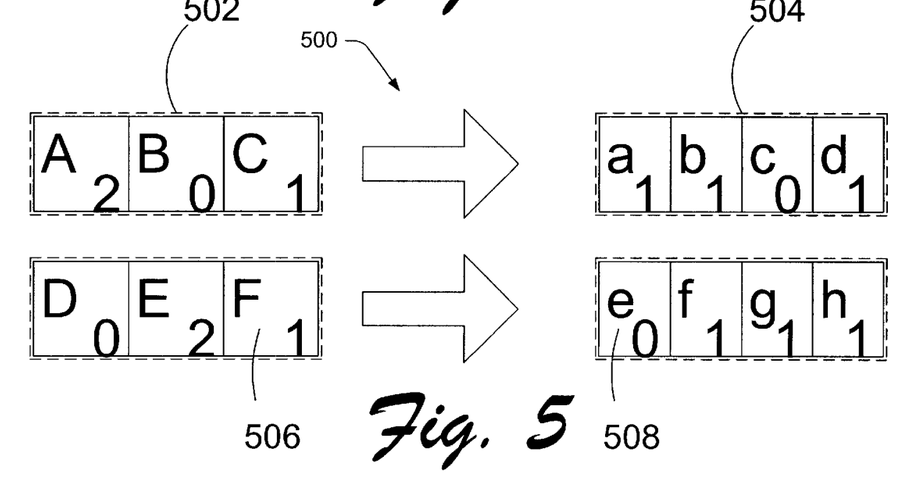
FIG. 5 is a block diagram illustrating an exemplary process by which 600 by 600 dpi 2-bit data is mapped to 800 by 600 1-bit data.

FIG. 5 shows a second implementation of a mapping process 500 by which an input data group 502 of the input print data file is converted into an output data group 504 contained within a dot grid data file. In the implementation of FIG. 5, two examples of the process 500 are illustrated. In both mappings, an input data group 502 having three pixels 506 is mapped to an output data group 504 having four pixels 508. By extension, it can be realized that input and output data groups, each having of any number pixels, could be designed.

In the first mapping example, the input data group 502 is mapped to the output data group 504 by the process 500. The input data group includes three pixels, "A," "B" and "C" having values 2, 0 and 1. They are mapped to an output data group formed by four pixels, "a," "b," "c" and "d" having values 1, 1, 0 and 1.

In the second mapping example, the input data group, having values 0, 2 and 1 are mapped to an output data group having values of 0, 1, 1 and 1. The method by which the mapping is performed, in which three pixels with a color bit depth of 2 are approximated in appearance by four pixels with a color bit depth of 1, may be made in several ways for any given input values. The two mapping processes illustrated are exemplary only.

Figure 6:
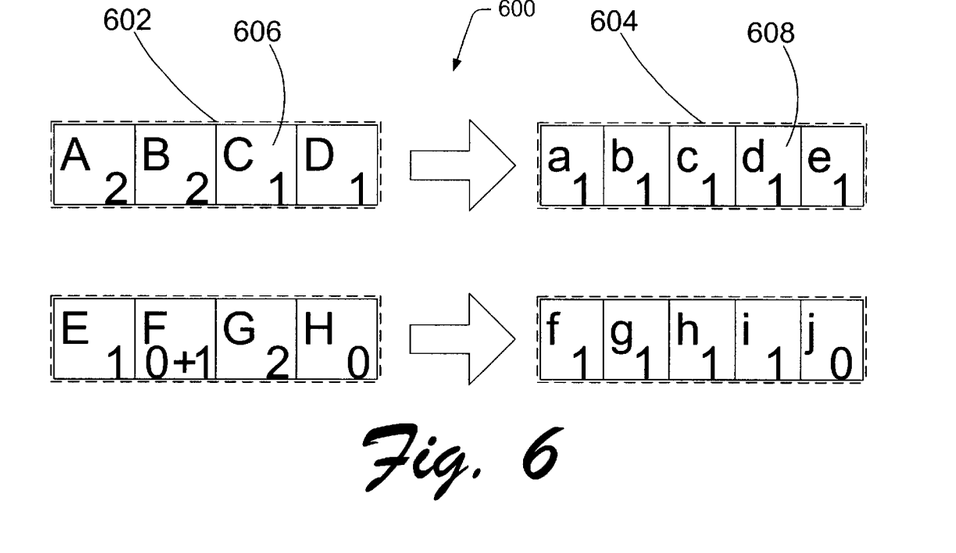
FIG. 6 is a block diagram illustrating an exemplary process by which 600 by 600 dpi 2-bit data is mapped to 750 by 600 1-bit data.

FIG. 6 shows a third implementation of a mapping process 600 by which an input data group of pixels 602 within the input print data file is converted into an output data group 604 of the dot grid data file. In the implementation of FIG. 6, two representative mappings illustrated. In both mappings an input data group 602 having four pixels 606 is mapped to an output data group 604 having five pixels 608. Because there is no whole number multiple between the number of input and output pixels within their respective groups, the mapping process may be considered to be non-integer.

Referring to the first mapping in FIG. 6, it can be seen that the sum of the data within the input data group is 6, i.e. 2+2+1+1=6. The sum of the output data group is 5. This is generally undesirable, since such a mapping tends to introduce print error. This error may be managed in a number of ways.

First, the mapping process 300 of FIG. 3, wherein a color image file 302 is halftoned to a print data file 304, can be constrained in an ink-limiting manner. Thus, the halftoning process 300 can be used to prevent the sum of the data in group 602 form exceeding the pixel locations in group 604. Accordingly, the problem caused by the sum of the data within the input data group exceeding the sum of the output data group is prevented.

Secondly, the error maybe accepted. The error may not be easily visible; therefore the error introduced may be considered to be within the range of acceptability.

Thirdly, the error may be carried over to a subsequent mapping. Referring to the second mapping illustrated by FIG. 6, it can be seen that a one has been added to, or "carried" over, to location "F." Thus, where the sum of the values of the pixel locations of a first input data group exceeds the number of pixels in the output data group, the excess may be added to a second input data group, typically related to adjacent pixels on the media. The number carried to the next input data group may be limited to adding one, two or other value to any given input data group. Similarly, limits may be placed on the number of input data groups between which values may be carried in sequence. For example, if a second input group receives added value from a first input group, then the second input group may be prevented from sending an excess value to a third input group. Instead, the second input group may have to accept the error.

Fourthly, the error may be corrected by adding additional ink droplets to media associated with the pixels associated with the output data group 604 on a subsequent pass in a multi-pass printing mode. Thus, in the mapping of FIG. 6, while only 5 pixels may be printed in a first pass, a sixth pixel could be printed on top of already printed pixels on a subsequent pass by the printhead.

Figure 7:
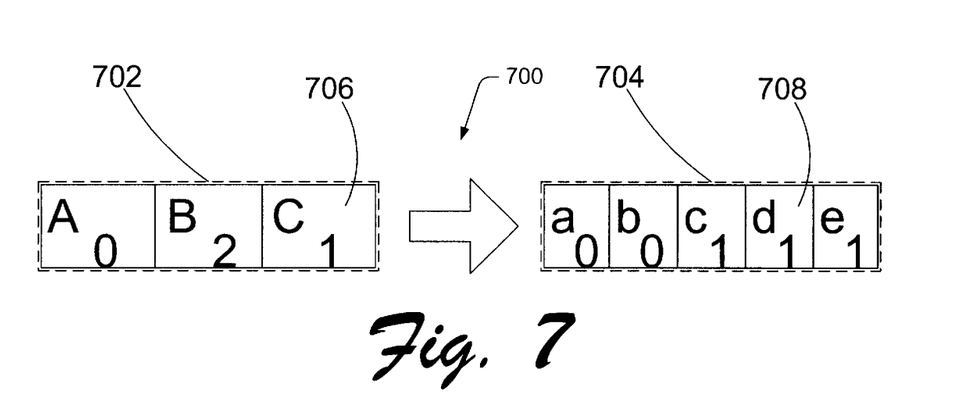
FIG. 7 is a block diagram illustrating an exemplary process by which 600 by 600 dpi 2-bit data is mapped to 1000 by 600 1-bit data.

FIG. 7 shows fourth implementation of mapping processes 700 by which an input data group 702 of the input print data file is mapped into an output data group 704 contained within a dot grid data file. In particular, the input data group 702 having three pixels 706 is mapped to an output data group 704 having five pixels 708. The input data group includes three pixels, "A," "B" and "C" having values 0, 2 and 1. They are mapped to an output data group formed by five pixels, "a, b," "d" and "e" having values 0, 0, 1, 1 and 1.

Figure 8:
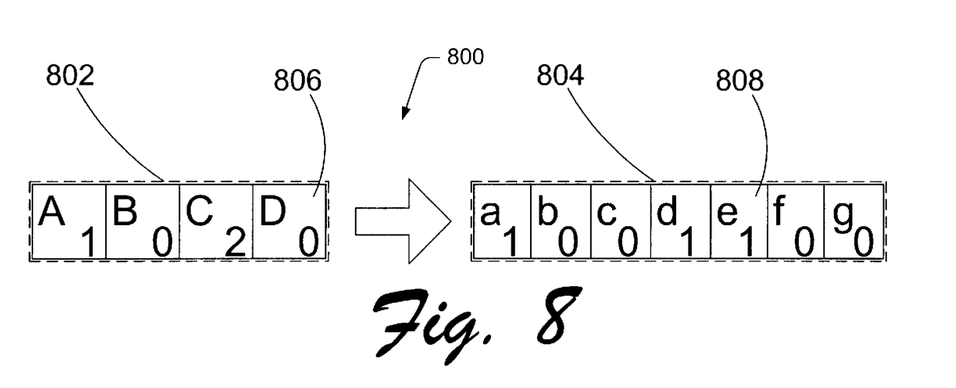
FIG. 8 is a block diagram illustrating an exemplary process by which 600 by 600 dpi 2-bit data is mapped to 1050 by 600 1-bit data.

FIG. 8 shows fifth implementation of mapping processes 800 by which an input data group 802 of the input print data file is converted into an output data group 804 contained within a dot grid data file. An input data group 802 having four pixels 806 is mapped to an output data group 804 having seven pixels 808. The input data group, having values 1, 0, 2 and 0 are mapped to an output data group having values of 1, 0, 0, 1, 1, 0 and 0. The method by which the mapping is performed, in which four pixels with a color bit depth of 2 are approximated in appearance by seven pixels with a color bit depth of 1, may be made in several ways for any given input values. The mapping process illustrated is exemplary only.

In reviewing FIGS. 4–8, the reader will notice that by selecting a particular mapping process, the pixel resolution of the output dot grid data file may be controlled. Referring to FIG. 4, two pixels within an input group 404 are mapped into three pixels within an output group 410. Because the three output pixels are associated with the same area of the print media as the two input pixels, the pen frequency (rate of printhead nozzle firing) would have to increase by a factor of 1.5 to print the same area in the same time. Similarly, FIG. 5 mapped an input group of three pixels into an output group of four pixels, resulting in the pen frequency increasing by a factor of 1.333. FIG. 6 resulted in a pen frequency increasing by a factor of 1.2. FIG. 7 resulted in a pen frequency increasing by a factor of 1.667. FIG. 8 resulted in pen frequency increasing by a factor of 1.75.

Thus, where a printer design engineer has a printhead with nozzles that are capable of firing at a given rate, a mapping such as one of those seen in FIGS. 4–7, or a similar mapping, could be selected. The selected mapping would operate the printhead at a nozzle firing frequency that is not too high for its construction, yet not so low as to result in inadequate ink saturation at a desired pixel print rate.

TABLE 1

| Mapping Type | Input Print Data File | Output Dot Grid Data File | Ratio of Pixels Per Unit Area, Input to Output | Freq. of Printhead Nozzle Firing | Ink per Unit Area, Black | Ink per Unit Area, Color |
|---|---|---|---|---|---|---|
| 2 Conventional | 600 by 600 | 600 by 600 | 1.0 | 27 KHz | >72 ng | 24 ng |
| 3 Conventional | 600 by 600 | 1200 by 600 | 2.0 | 54 KHz | 144 ng | 48 ng |
| 4 FIG. 4 | 600 by 600 | 900 by 600 | 1.5 | 40.5 KHz | 108 ng | 36 ng |
| 5 FIG. 5 | 600 by 600 | 800 by 600 | 1.333 | 35.991 KHz | 95.976 ng | 31.992 ng |
| 6 FIG. 6 | 600 by 600 | 750 by 600 | 1.2 | 32.4 KHz | 86.4 ng | 28.8 ng |
| 7 FIG. 7 | 600 by 600 | 1000 by 600 | 1.667 | 45.0 KHz | 120 ng | 40 ng |
| 8 FIG. 8 | 600 by 600 | 1050 by 600 | 1.75 | 47.25 KHz | 126 ng | 42 ng |

Table 1 shows a comparison of the results of integer and non-integer mapping from halftoned image data to dot grid data. Column 1 indicates the mapping type. The reader will realize that an almost infinite number of mappings could be created, and that those listed in Table 1 are simply illustrative.

Row 2 is associated with a conventional mapping process, wherein 600 by 600 halftoned image data is mapped to 600 by 600 dot grid data. Accordingly, the ratio of input to output pixels is 1.0, an integer value. As a result, the printhead nozzles are fired at a rate of 27 KHz (due to the speed of the printhead along the carriage rod, which will be considered a constant of 45 inches per second throughout the example of Table 1). In response, 72 ng (nano grams) of black ink and 24 ng of color ink are deposited in a unit area (also constant throughout Table 1 at 1/300" by 1/300") as a result of the use of 18 ng of black ink and 6 ng of color ink per pixel. The conventional mapping process associated with row 2 results in too little ink per unit area for saturation; print output quality will therefore be inadequate in many applications.

Row 3 is associated with a conventional mapping process, wherein 600 by 600 halftoned image data is mapped to 1200 by 600 dot grid data. Accordingly, the ratio of input to output pixels is 2.0, an integer value. As a result, the printhead nozzles are fired at a rate of 54 KHz. In response, 144 ng of black ink and 48 ng of color ink are deposited in a unit area. The conventional mapping process associated with row 3 may necessitate the acquisition of a more expensive printhead, which can perform at 54 KHz. However, the ink saturation is satisfactory, i.e. there is adequate ink applied to the media.

Row 4 is associated with the mapping process of FIG. 4, wherein 600 by 600 halftoned image data is mapped to 900 by 600 dot grid data. Accordingly, the ratio of input to output pixels is 1.5, a non-integer value. As a result, the printhead nozzles are fired at a rate of 40.5 KHz. In response, 108 ng of black ink and 36 ng of color ink are deposited in a unit area. Due to the intermediate printhead nozzle firing rate, the printhead may not have to be upgraded; additionally, in many media applications the ink deposition density is satisfactory. Thus, satisfactory ink densities have been achieved without the need to upgrade printhead hardware.

Row 5 is associated with the mapping process of FIG. 5, wherein 600 by 600 halftoned image data is mapped to 800 by 600 dot grid data. Accordingly, the ratio of input to output pixels is 1.333, a non-integer value. As a result, the printhead nozzles are fired at a rate of 35.9 KHz. In response, 95.9 ng of black ink and 31.9 ng of color ink are deposited in a unit area. Due to the combination of printhead nozzle firing rate and ink deposition rate, this design option may be a better design choice than those seen in rows 2 and 3.

Row 6 is associated with the mapping process of FIG. 6, wherein 600 by 600 halftoned image data is mapped to 750 by 600 dot grid data. Accordingly, the ratio of input to output pixels is 1.2, a non-integer value. As a result, the printhead nozzles are fired at a rate of 32.4 KHz. In response, 86.4 ng of black ink and 31.9 ng of color ink are deposited in a unit area. Due to the combination of printhead nozzle firing rate and ink deposition rate, this design may provide a best-fit with certain printheads, ink and media.

Row 7 is associated with the mapping process of FIG. 7, wherein 600 by 600 halftoned image data is mapped to 1000 by 600 dot grid data. Accordingly, the ratio of input to output pixels is 1.667, a non-integer value. As a result, the printhead nozzles are fired at a rate of 45 KHz. In response, 120 ng of black ink and 40 ng of color ink are deposited in a unit area. Due to the combination of printhead nozzle firing rate and ink deposition rate, this design may provide a best-fit with certain printheads, ink and media.

Row 8 is associated with the mapping process of FIG. 8, wherein 600 by 600 halftoned image data is mapped to 1050 by 600 dot grid data. Accordingly, the ratio of input to output pixels is 1.75, a non-integer value. As a result, the printhead nozzles are fired at a rate of 47.25 KHz. In response, 126 ng of black ink and 42 ng of color ink are deposited in a unit area. Due to the combination of printhead nozzle firing rate and ink deposition rate, this design may provide a best-fit with certain printheads, ink and media.

Figure 9:
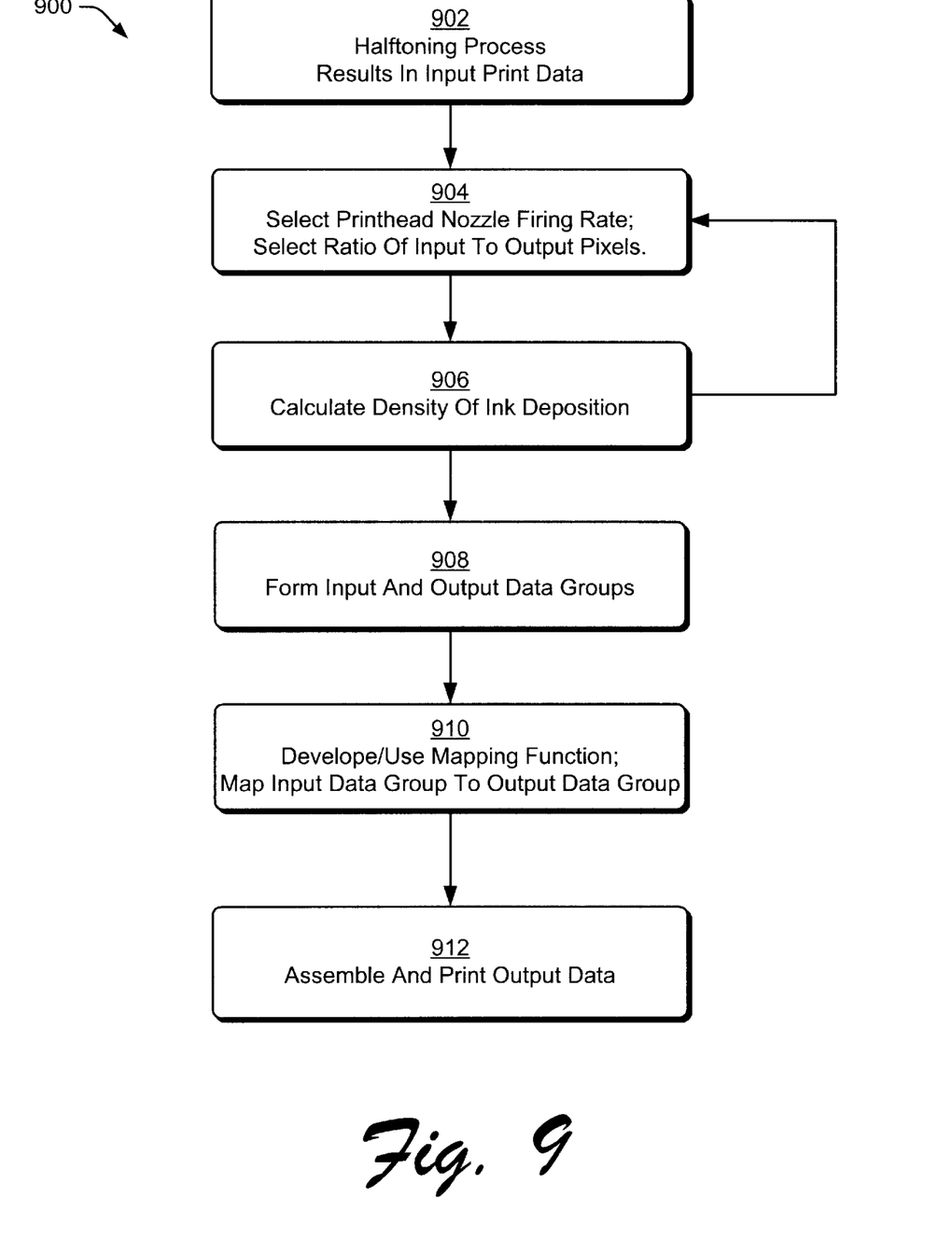
FIG. 9 is a flow chart illustrating a method by which a print system is enabled to print data on a non-integer grid.

FIG. 9 shows a method 900 by which a print system 200 is enabled to print data on a non-integer grid, and which illustrates the operation of the dot grid mapping module 210, 214.

At block 902, input print data 304 from a halftoning process 300 is obtained. In one implementation, the bit-depth value associated with each pixel location is limited to 0, 1 or 2.

At block 904, a ratio of pixels, input to output, is selected to result in a satisfactory printhead nozzle firing rate. The reader will recall that Table 1 indicates that a number of choices may be made, whereby the ratio of input to output pixels may be used to strike a balance between the printhead nozzle firing rate and the ink deposition rate per area. While Table 1 indicates some of the choices that can be made, it is clear that other entries could be made to the table in a manner similar to the entries shown. The printhead nozzle firing rate is generally selected to be less than a maximum rate for which the printhead is rated. Where the firing rate of the printhead is inadequate, the printhead may have to be replaced, or the printhead speed on the carriage rod reduced, or other adjustment made.

At block 906, the printhead firing rate is used to determine if the rate of ink deposition is adequate. While exact ink deposition values are dependent upon the printhead nozzle hardware, ink and other factors, the rate of ink deposition is proportional to the rate of nozzle firing.

Some iteration between blocks 906 and 904 may be required to result in a satisfactory balance between the printhead nozzle firing rate and the weight per unit area of the ink deposited.

At block 908, input and output data groups are formed according to the ratio of pixels selected. Generally, the number of pixels in the output group is larger than the number of pixels in the input group, allowing the printhead firing rate to be increased in comparison to a one-to-one pixel mapping such as that seen in row 2 of Table 1. Accordingly, the pixels associated with an input print data file 304 and an output dot grid data file 402 are divided into input and output pixel groups, such as groups 404 and 410, as seen in FIG. 4.

At block 910, a mapping process or function, such as those mapping functions 400, 500, 600 shown by FIGS. 4 through 6 is developed and/or implemented. For example, where an input group of two pixels is mapped into an output group of three pixels, a function such as mapping process 400 is selected. Each possible value that could be associated with the two input pixels must be assigned an output value associated with each of the three output pixels. FIG. 4 discloses mappings associated with four such values.

At block 912, data from the output group of pixels is assembled into a dot grid, which includes the firing decisions (i.e. ones or zeros) for the printhead at each pixel. The dot grid may then be used to create actual print output.

Accordingly, a system and method of printing allows use of a print data file and a print dot grid wherein the resolution of the print dot grid is not an integer multiple of the resolution of the print data. By forming a print data group of one or more pixel data elements, and by forming a dot grid group of a different number of dot grid elements, data can be mapped from the print data group to the dot grid group. Consequently, the number of pixels in the dot grid can be controlled. As a result, the rate of printhead nozzle firings and the ink quantity deposited on a unit area of print media can be carefully controlled.

Although the disclosure has been described in language specific to structural features and/or methodological steps, it is to be understood that the appended claims are not limited to the specific features or steps described. Rather, the specific features and steps are exemplary forms of implementing this disclosure. For example, while Table 1 indicates a number of choices available, in terms of printhead nozzle firing rate and ink deposition per unit area, other table entries could be made in the manner of those shown. Additionally, Table 1 is based on printhead movement at 45 inches per second, a $\frac{1}{300}"$ by $\frac{1}{300}"$ unit area and an ink density of 18 ng for black and 6 ng for color per pixel within the unit area. Therefore, the teachings of the disclosure could be adapted to different printer design needs.

What is claimed is:

1. A method of printing, comprising:

forming an input data group of a first quantity of pixels;

forming an output data group of a second quantity of pixels, wherein the second quantity is not an integer multiple of the first quantity;

forming a ratio of the first quantity to the second quantity;

adjusting the ratio to set a frequency of a printhead nozzle firing rate by adding or removing pixels from the input and output data groups; and mapping data from the input data group to the output data group.

2. The method of claim 1, additionally comprising:

setting the first quantity equal to two; and setting the second quantity equal to three.

3. The method of claim 1, additionally comprising:

setting the first quantity equal to three; and setting the second quantity equal to five.

4. A method of printing, comprising:

forming an input data group of a first quantity of pixels;

forming an output data group of a second quantity of pixels, wherein the second quantity is not an integer multiple of the first quantity;

mapping data from the input data group to the output data group; and carrying value from the input data group to a second input data group when a sum of data within the input data group exceeds the second quantity of pixels.

5. A method of printing, comprising:

forming an input data group of a first quantity of pixels;

forming an output data group of a second quantity of pixels, wherein the second quantity is not an integer multiple of the first quantity;

mapping data from the input data group to the output data group; and setting the first and second quantities to balance a printhead nozzle firing rate with a density of ink deposited per unit area.

6. A method of printing, comprising:

forming an input data group of a first quantity of pixels;

forming an output data group of a second quantity of pixels, wherein the second quantity is not an integer multiple of the first quantity;

mapping data from the input data group to the output data group; and forming a ratio of the first quantity to the second quantity; and adjusting the ratio to set a frequency of a printhead nozzle firing rate.

7. A method of printing, comprising:

forming an input data group of a first quantity of pixels;

forming an output data group of a second quantity of pixels, wherein the second quantity is not an integer multiple of the first quantity;

mapping data from the input data group to the output data group; and forming a ratio of the first quantity to the second quantity; and adjusting the ratio to control a density of ink deposited per unit area.

8. A print system, comprising:

means for forming an input data group of a first quantity of pixels;

means for forming an output data group of a second quantity of pixels, wherein the second quantity is not an integer multiple of the first quantity;

carrying value from the input data group to a second input data group when a sum of data within the input data group exceeds the second quantity of pixels; and means for mapping data from the input data group to the output data group.

9. The print system of claim 8, additionally comprising:

means for setting the first quantity equal to two; and setting the second quantity equal to three.

10. A print system, comprising:

means for forming an input data group of a first quantity of pixels;

means for forming an output data group of a second quantity of pixels, wherein the second quantity is not an integer multiple of the first quantity;

means for mapping data from the input data group to the output data group; and means for setting the first and second quantities to balance a printhead nozzle firing rate with a density of ink deposited per unit area.

11. A print system, comprising:

means for forming an input data group of a first quantity of pixels;

means for forming an output data group of a second quantity of pixels, wherein the second quantity is not an integer multiple of the first quantity;

means for mapping data from the input data group to the output data group;

means for forming a ratio of the first quantity to the second quantity; and means for adjusting the ratio to set a frequency of a printhead nozzle firing rate by adding or removing pixels from the input and output data groups.

12. A print system, comprising:

means for forming an input data group of a first quantity of pixels;

means for forming an output data group of a second quantity of pixels, wherein the second quantity is not an integer multiple of the first quantity;

means for mapping data from the input data group to the output data group;

means for forming a ratio of the first quantity to the second quantity; and means for adjusting the ratio to control a density of ink deposited per unit area.

13. A system, comprising:

a dot grid mapping module to form input and output data groups, having a first and second quantity of pixels, respectively, wherein the second quantity is not an integer multiple of the first quantity, and to map data from the input to the output data group, wherein the mapping comprises carrying value from the input data group to a second input data group when a sum of data within the input data group exceeds the second quantity of pixels; and a dot grid data file to receive data from the output data group.

14. A system, comprising:

a dot grid mapping module to form input and output data groups, having a first and second quantity of pixels, respectively, wherein the second quantity is not an integer multiple of the first quantity, and to map data from the input to the output data group;

a dot grid data file to receive data from the output data group; and a halftoning module to create data to form the input data group from a color image data file.

15. A system, comprising:

a dot grid mapping module to form input and output data groups, having a first and second quantity of pixels, respectively, wherein the second quantity is not an integer multiple of the first quantity, and to map data from the input to the output data group;

a dot grid data file to receive data from the output data group; and means for setting the first and second quantities to balance a frequency of a printhead nozzle firing rate with a density of ink deposited per unit area.

16. A computer-readable medium having computer-executable instructions thereon which, when executed by a computer, cause the computer to:

form an input data group of a first quantity of pixels;

form an output data group of a second quantity of pixels, wherein the second quantity is not an integer multiple of the first quantity; and map data from the input data group to the output data group, wherein the mapping comprises carrying value from the input data group to a second input data group when a sum of data within the input data group exceeds the second quantity of pixels.

17. The computer-readable medium of claim 16, additionally causing the computer to set the first quantity equal to two; and set the second quantity equal to three.

18. A computer-readable medium having computer-executable instructions thereon which, when executed by a computer, cause the computer to:

form an input data group of a first quantity of pixels;

form an output data group of a second quantity of pixels, wherein the second quantity is not an integer multiple of the first quantity;

map data from the input data group to the output data group; and set the first and second quantities to balance a frequency of a printhead nozzle firing rate with a density of ink deposited per unit area.

19. A computer-readable medium having computer-executable instructions thereon which, when executed by a computer, cause the computer to:

form an input data group of a first quantity of pixels;

form an output data group of a second quantity of pixels, wherein the second quantity is not an integer multiple of the first quantity;

map data from the input data group to the output data group; and set the first quantity and the second quantity to result in a printhead nozzle firing rate which deposits ink at a desired quantity per unit area.

20. A computer-readable medium having computer-executable instructions thereon which, when executed by a computer, cause the computer to:

form an input data group of a first quantity of pixels;

form an output data group of a second quantity of pixels, wherein the second quantity is not an integer multiple of the first quantity;

map data from the input data group to the output data group;

form a ratio of the first quantity to the second quantity; and adjust the ratio to set a frequency of a printhead nozzle firing rate.

21. A computer-readable medium having computer-executable instructions thereon which, when executed by a computer, cause the computer to:

form an input data group of a first quantity of pixels;

form an output data group of a second quantity of pixels, wherein the second quantity is not an integer multiple of the first quantity;

map data from the input data group to the output data group;

form a ratio of the first quantity to the second quantity; and adjust the ratio to control a density of ink deposited per unit area.

* * * * *

UNITED STATES PATENT AND TRADEMARK OFFICE
CERTIFICATE OF CORRECTION

PATENT NO. : 6,631,964 B2
DATED : October 14, 2003
INVENTOR(S) : Askeland et al.

It is certified that error appears in the above-identified patent and that said Letters Patent is hereby corrected as shown below:

<u>Title page,</u>
Item [75], Inventors, replace "Roanld A. Askeland" with -- Ronald A. Askeland --

Signed and Sealed this

Tenth Day of August, 2004

JON W. DUDAS
*Acting Director of the United States Patent and Trademark Office*